United States Patent [19]

Haddon

[11] Patent Number: 4,729,698

[45] Date of Patent: Mar. 8, 1988

[54] MULTI-PURPOSE AND VERSATILE PORTABLE POWER TOOL

[76] Inventor: Jesse E. Haddon, P.O. Box 515, 4719 E. Elm St., McHenry, Ill. 60050

[21] Appl. No.: 904,561

[22] Filed: Sep. 5, 1986

[51] Int. Cl.[4] .................... B23B 45/14

[52] U.S. Cl. .................... 408/110; 144/1 F; 144/106; 408/89; 408/100

[58] Field of Search .................... 408/72 R, 88, 89, 99, 408/100, 115 R, 241 R, 241 S, 712; 144/1 E, 1 F, 35 A, 104, 106, 134 D, 136 C; 407/110–112

[56] References Cited

U.S. PATENT DOCUMENTS

| | | | |
|---|---|---|---|
| D. 180,640 | 7/1957 | Buck | D63/1 |
| 2,576,090 | 11/1951 | Krause | 143/132 |
| 2,714,905 | 8/1955 | Clayton | 143/43 |
| 2,733,737 | 2/1956 | Lindee | 142/1 |
| 2,768,663 | 10/1956 | Jones | 144/1 |
| 2,787,265 | 4/1957 | Neidt | 143/43 |
| 2,856,799 | 10/1958 | De Curtis | 77/19 |
| 2,982,320 | 5/1961 | Trumbull et al. | 143/43 |
| 2,997,900 | 8/1961 | Pugsley | 408/712 X |
| 3,009,493 | 11/1961 | Dodegge | 144/1 |
| 3,096,798 | 7/1963 | Pugsley | 408/110 X |
| 3,107,556 | 10/1963 | Pugsley | 408/110 |
| 3,285,135 | 11/1966 | Shaw | 90/12 |
| 3,890,058 | 6/1975 | Self et al. | 408/712 X |
| 4,072,440 | 2/1978 | Glover | 408/112 |
| 4,349,301 | 9/1982 | Boyajian | 408/712 X |
| 4,572,715 | 2/1986 | Wolff | 144/134 D X |

*Primary Examiner*—Gil Weidenfeld
*Assistant Examiner*—Steven C. Bishop
*Attorney, Agent, or Firm*—Leydig, Voit & Mayer

[57] ABSTRACT

A portable electric power tool constituted by two cooperating main components, namely, a power head of predetermined exterior cross-sectional shape and a sleeve with interior surfaces mating to the power head to afford relative sliding movement, but not relative rotational movement of the two. The power head includes a driven shaft adapted by a chuck or the like to receive and hold any of a variety of cutters or the like. The foot of the sleeve is adapted for sliding translation along, or positioning on, a workpiece surface. The angle of the sleeve body relative to the foot is adjustable. By locking the sleeve at any desired angle to the foot, the angle of penetration or engagement between a driven cutter and a workpiece may be accurately pre-established. By the provision of an adjustable stop to define a limit position of inward movement of the power head relative to the sleeve, the depth of penetration of a cutter on the power head is pre-established without reliance on the operator's estimating and dexterity skills.

11 Claims, 13 Drawing Figures

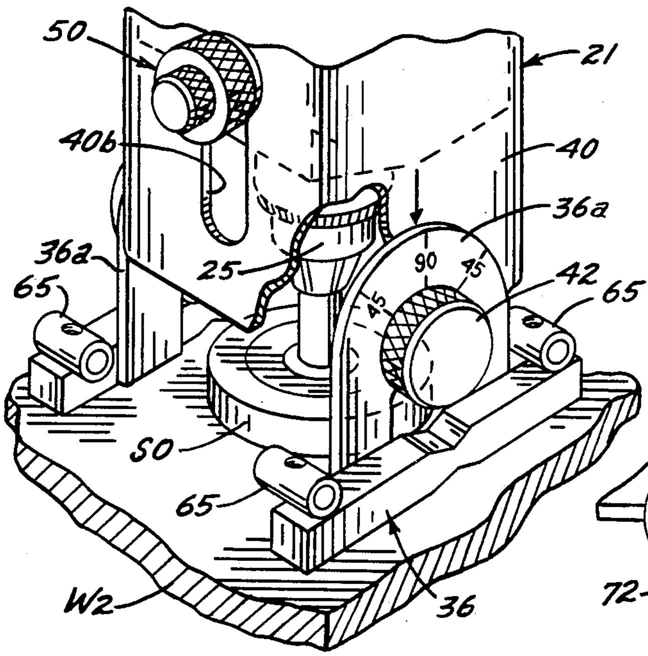
Fig. 10.
Fig. 12.
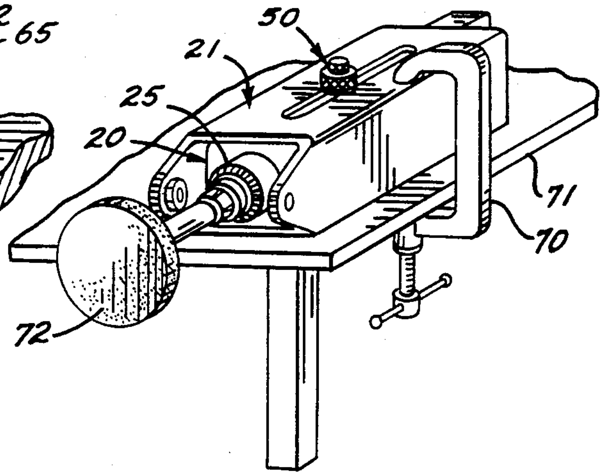
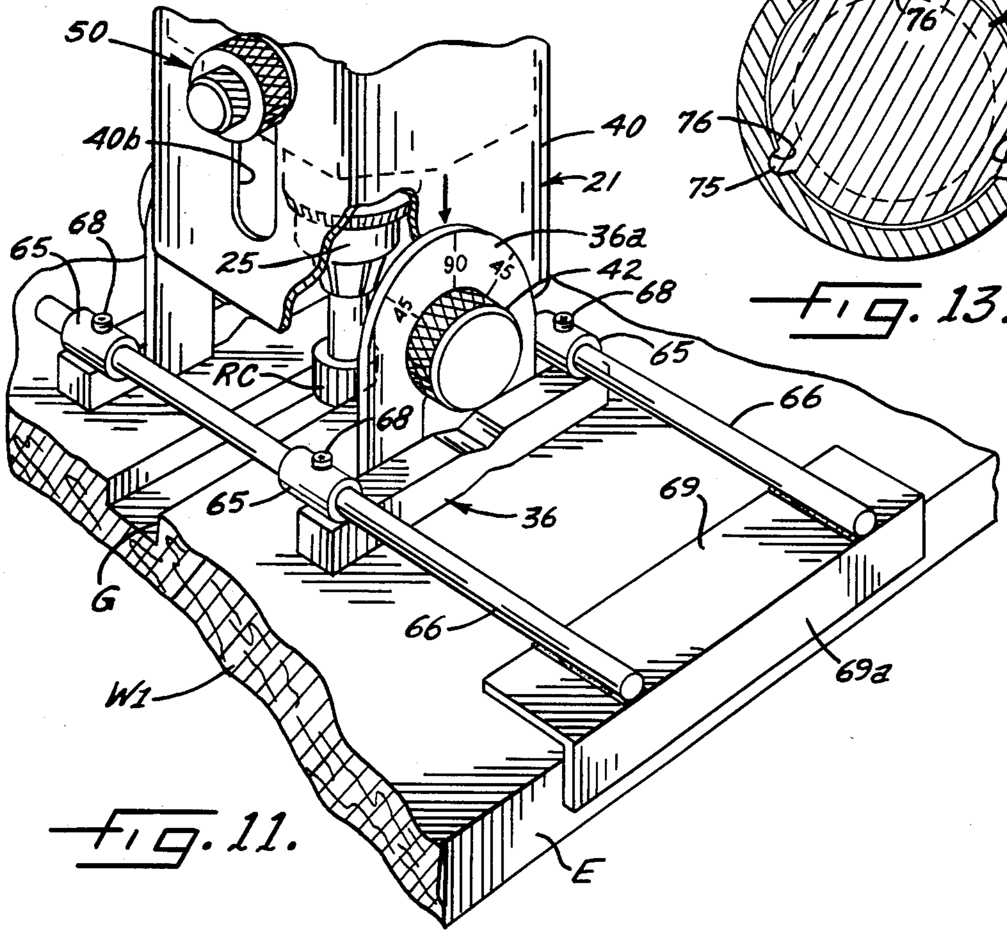
Fig. 11.
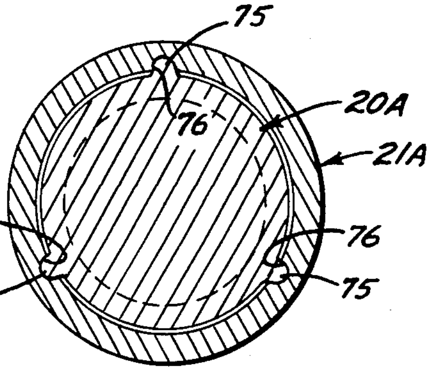
Fig. 13.

MULTI-PURPOSE AND VERSATILE PORTABLE POWER TOOL

BACKGROUND OF THE INVENTION

The present invention pertains in general to the art of portable power tools; it relates, more particularly, to electric hand tools similar in nature to the well known and widely used electric drills.

The power head of a conventional portable electric hand drill includes a driven shaft carrying a chuck adapted to receive and hold any of a variety of cutters or the like. Drill bits are the most widely used cutters, but the chuck may be used to receive and grip the shanks of such different operative elements as, for example, routing cutters, burrs, screw driving implements, sanding discs, or polishing pads. All such elements are here lumped within the generic term "cutters or the like".

The common electric drill usually is made with a pistol grip handle, or something akin to it, and a switch trigger—so that the drill and its cutter are held and manipulated by one hand of the user. In some instances, a second handle is employed for two-handed manipulation. In either case, the human operator is left to his visual, muscular, and estimating skills for a determination of the angle at which a cutter such as a drill bit penetrates a workpiece and thus the angle of a drilled hole, for a determination of the depth of a blind hole, or for the path through which a routing or burring cutter is moved. The angles and depths of drilled holes are hard to control, and sufficient accuracy in routing a straight groove is almost beyond the skill of hand control by a human operator.

Because of these and other considerations, a whole host of accessories have been proposed for use with electric hand drills. Generally, these comprise some carriage into which the drill body is strapped or clamped, the carriage then being moved with mechanical action and guidance on a base so as to determine the angle of attack, the depth, or the path of the cutting element. Probably the most familiar of such accessories is a "drill press" accessory having a stand or base, and a carriage in which the electric drill is strapped together with a rack and pinion arrangement for moving the carriage vertically up and down.

Accessories of that type enable a power head or an electric drill to be employed with greater accuracy than, or for functions not achievable with, ordinary hand manipulation. But such accessories are in the main heavy, bulky and not portable; they convert an electric drill into a shop machine which usually serves only one purpose and which cannot readily be taken by a user to his attic or a country fishing cabin where different "on-site" jobs may need to be performed.

OBJECTS AND ADVANTAGES OF THE INVENTION

The general aim of the present invention is to provide a power tool which is fully portable and usable outside of (and in) a shop with greater precision than that obtainable by purely hand manipulation.

It is a coordinate objective to realize a portable power tool having greater versatility than a conventional electric hand drill or the like, yet by added structural components which are very simple and relatively inexpensive.

Another object is to provide a two-part portable power tool which enables accurate determination of the angle of penetration of cutter into a workpiece without reliance on the manual skill and visual accuity of the operator—thereby to determine the angle of holes (including but not limited to those at 90°) drilled in the workpiece.

A related object is to provide such a portable power tool which enables accurate determination of the depth of cutter penetration, and thus the depth of blind holes, without reliance on the operator's estimations during the actual drilling.

A related object is to provide such a portable power tool which enables the penetration of a cutter into a workpiece to be pre-established and maintained constant as the tool is moved over the workpiece surface—thereby to make possible routing or milling with precision greater than could ever be achieved with a conventional hand-held tool.

Another related object is to provide such a two part power tool which facilitates cutter action on, or the drilling of holes in, rod-like workpieces such, for example, as dowels or pipes.

Yet another object is to obtain from such a two-part hand tool reasonably precise routing or dado cuts by motions guided with the aid of an adjustable fence.

BRIEF DESCRIPTION OF THE DRAWING FIGURES

These and other objects and advantages of the invention will become apparent as the following description proceeds in conjunction with the accompanying drawings, in which FIG. 1 is a perspective view of a power head forming one of two main components in an exemplary embodiment of a portable power tool constructed in accordance with the present invention;

FIG. 10 is a fragmentary perspective view illustrating the manner in which the power tool may be employed with a sanding disc or planing element to act on a workpiece;

FIG. 11 is a fragmentary perspective view illustrating the manner in which the power tool may be utilized in conjunction with an associated, adjustable fence to perform a routing operation on a workpiece;

FIG. 12 is a perspective illustration of the manner in which the power tool may be rigidly supported and clamped to a table or the like to form a power spindle carrying a grinding wheel or similar cutting element; and FIG. 13 is a horizontal section illustrating in principle one of many various alternative embodiments of the cross-sectional shape which may be given to the power head and a cooperating sleeve.

While the invention has been shown and will be described in some detail with reference to a particular and preferred embodiment which is to be taken as an example, there is no intention thus to limit the invention to such detail. On the contrary, it is intended here to cover all modifications, alternatives and equivalents which fall within the spirit and scope of the invention as defined by the appended claims.

DETAILED DESCRIPTION OF THE PREFERRED EMBODIMENT

In accordance with the present invention, a two-part portable power tool is formed essentially by a power head 20 and a cooperating sleeve 21, with the former shaped to have relative sliding or telescopic movement in the latter.

Figure 1:
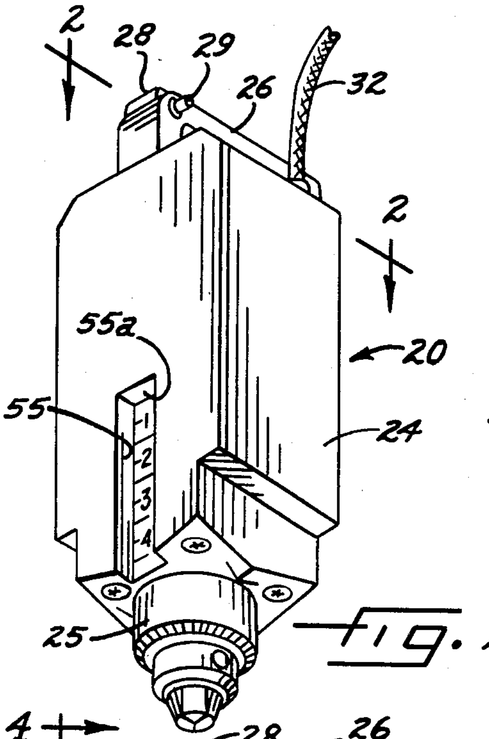
Figure 2:
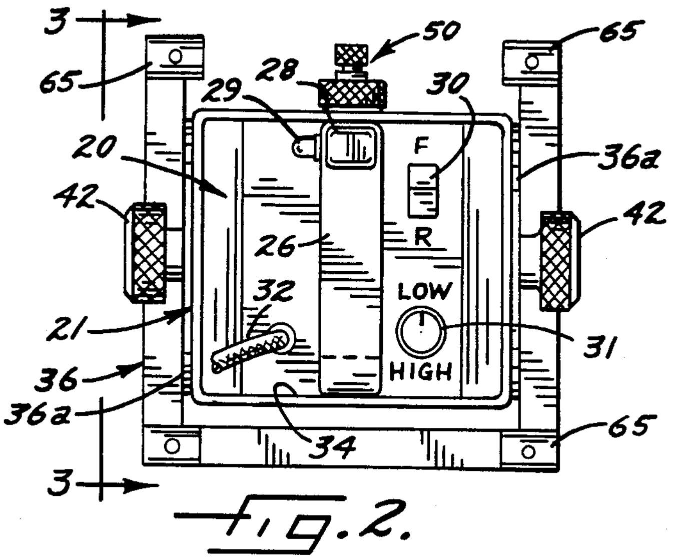
FIG. 2 is a plan view of the portable power tool.

In the example of FIG. 1, the power head 20 is constructed with a casing 24 of predetermined cross-sectional shape, here generally rectangular and approximately square. The casing contains a conventional variable-speed, reversible motor (not visible) of known type having a power driven shaft which is adapted to receive and hold any of a variety of cutters or the like (such elements as drill bits, routing bits, dado cutters, sanding discs, polishing discs and burring tools here being called "operational elements"). In the present drawings, the driven shaft is not per se visible because it mounts a chuck 25 of the sort found in conventional electric drills and capable of receiving and locking to the shank of any chosen operative element.

Except for the preferred cross-sectional shape of rectangular configuration, the power head 20 itself bears much similarity to an ordinary electric hand drill—and, indeed, it may be used, separate and apart from the sleeve 21, in the same fashion as an ordinary hand drill. It need only be noted briefly, therefore, that the power head 20 includes at its upper end a transverse handle 26 with a trigger 28 of an on-off switch conveniently accessible to the thumb on the hand of a human operator. The switch may be releasably latched in the "on" position by depressing a pin 29. The direction of rotation of the motor and the chuck 25 may be selected by setting a toggle switch 30 on the top of the casing 24, while the rotational speed of the motor and the operative element in the chuck 25 may be adjusted by turning a knob 31 associated with a potentiometer or silicon controlled rectifier circuit which controls the speed of the electric motor. An electric power cord 32 is provided in the usual fashion for connecting the power head to a voltage source outlet. If desired, the motor within the casing 24 may be of the pneumatic type operable by compressed air.

The sleeve 21 is hollow and constructed with interior surfaces adapted to mate to the cross-sectional shape of the power head 20. As here shown, the sleeve is constructed of relatively thick metal sheet or plate to define a central, rectangular passage 34 which receives the casing 24 of the power head snugly but with freedom for relative sliding movement in a direction parallel (here shown vertical) to the axis of the shaft and the chuck 25,—but without freedom to rotate relative to the sleeve. At its one (lower) end, the sleeve 21 includes a foot 36 having a planar undersurface 38 adapted to rest on any flat surface, including the flat surface of a workpiece which is to be acted upon.

More specifically, the sleeve 21 is constructed to include a four-sided body 40 of hollow cross-section with a foot 36 fixed to the lower end of that body and here made as a generally flat, three-sided or U-shaped member, i.e., somewhat like a horseshoe with an open medial region generally corresponding in shape but somewhat larger than the passage 34 through the body 40.

Although in some embodiments of the invention, the foot 36 may be constituted by the lower edges of the body 40 itself or may be integrally welded to the lower end of that body, in the preferred arrangement the foot 36 is constructed of metal bar stock with upstanding plates or ears **36*a* welded at its two opposite sides. These ears are drilled to receive threaded studs 41 (FIG. 4) fixed to respective ones of two knobs 42. The studs pass through aligned openings in the body 40 to enter nuts 44 welded to the inner surface of the body's passage. By tightening the knobs 42 and the studs 41, the sleeve 21 becomes a rigid unit constituted of the foot 36 and the body 40. It may be observed in FIGS. 3, 5 and 7 that the nuts 44 are located on depending, rounded "tabs" constituted by extensions of two sides of the body 40, but the remaining two sides are foreshortened or cut away so that the body 40 is, in net effect, spaced vertically above the upper surface 38*a* of the foot 36**.

In accordance with one aspect of the invention, means are provided to establish an adjustable limit position to which the power head may move lengthwise through the sleeve toward that one end at which the foot is located. For this purpose, a stop member is adjustably located in a direction vertically along the sleeve, and arranged to be engaged by a cooperating limit surface on the power head. As specifically shown in FIGS. 4, 5 and 6, one rectangular side **40*a* of the sleeve body 40 is formed with a vertically extending slot 40*b* through which a vertically adjustable stop/lock assembly 50 extends. This assembly includes an inner, shouldered stop member 51 (FIG. 6) projecting outwardly through the slot 40*b*. The member 51 is internally threaded to receive a locking bolt 52, and externally threaded to receive a knurled threaded clamping ring 54. That portion of the stop member 51 disposed inside the passage of the body 40 is adapted to enter a vertical channel 55 formed in one side of the casing 24 for the power head 20 as the latter is moved downwardly into the sleeve 21. This slot 55 is best seen in FIG. 1 and may include a numerical scale printed or scribed on its inner surface. Whatever the vertical position of the stop assembly in its slot 40*b*, when the power head 20 is moved sufficiently downwardly into the sleeve 21 such that the roof 55*a* of the channel 55 engages the member 51, then the power head cannot progress further beyond that limit position. The assembly 50 by gripping the edges of the slot 40*b*** forms an adjustable, positive stop.

Referring again to FIG. 6, when the locking bolt 52 is backed out of the stop member sufficiently, it eliminates pressure on a captive pressure plate 53 and thereby leaves a layer of friction material 53' (bonded to the plate) free of the opposed innermost surface of the channel 55. When the clamping ring 54 is threaded inwardly (to the right as viewed in FIG. 6), the opposed surfaces of the ring 54 and the member 51 (together with a washer 56) grip the sleeve side 40a at regions bordering the slot 40b—thereby fixing the assembly 50 to the sleeve 21 at an adjusted position. It is only necessary to loosen the clamping ring 54, slide the assembly upwardly or downwardly in the slot 40b to the desired position and then re-tighten the clamping ring 54. The assembly 50 therefore in this mode constitutes a vertically adjustable limit stop which determines the lowermost position to which the power head 20 may be moved downwardly into the sleeve 21.

Figure 5:
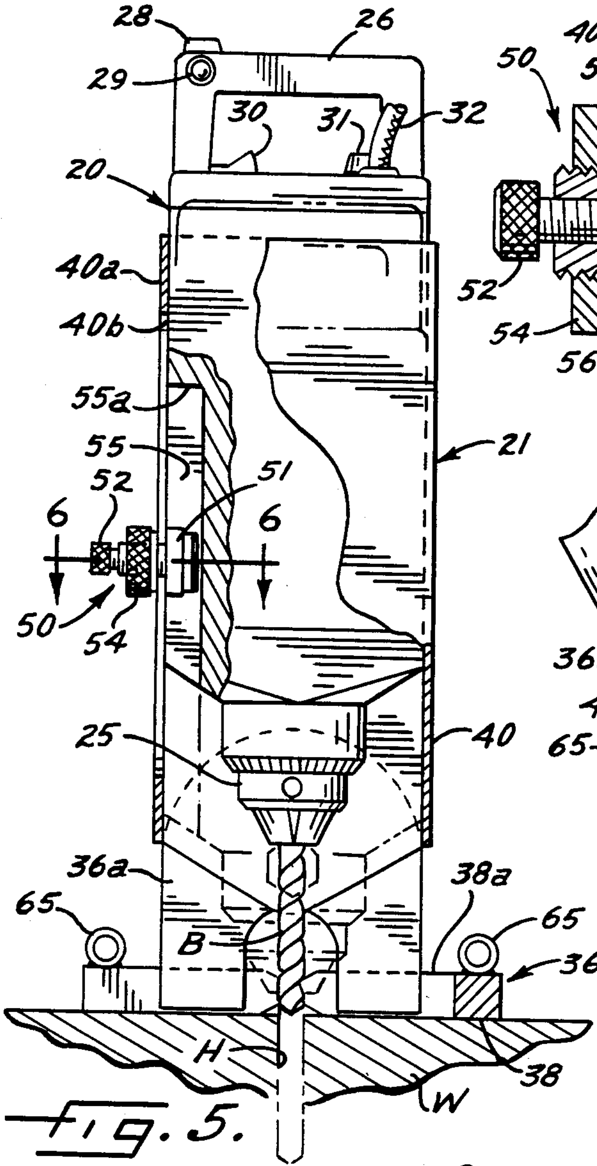
FIG. 5 is a vertical section taken substantially along the line 5—5 in FIG. 4, and showing the drilling of a blind hole normal (i.e., at 90°) to a workpiece surface.
Figure 6:
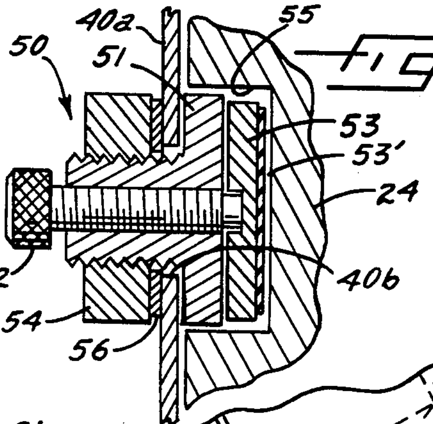
FIG. 6 is a fragmentary horizontal section taken substantially along the line 6—6 in FIG. 5.

This adjustable stop means makes it possible for the user of the power tool to accurately predetermine and achieve the desired depth of a blind hole to be drilled in a workpiece W. Referring to FIG. 5 in this regard, it is only necessary for the human operator to mount a drill bit B in the chuck 25 and, with the clamping ring 54 loosened, move the power head downwardly into the sleeve until the tip of a bit B just touches (and perhaps rests upon) the surface of an underlying workpiece W on which the foot 36 is resting. Thereafter, the stop assembly 50 is slidably adjusted along the slot 40b until the top surface of the stop member gives a reading on the scale equal to the desired depth of a blind hole. Once this adjustment has been made, the clamping ring 54 is tightened to rigidly fix the position of the stop assembly 50 in the sleeve 20. Now, the power head may be withdrawn upwardly in the sleeve and the power tool is located with the undersurface 38 of the foot 36 resting on the upper surface of the workpiece W and the bit B above the location of a hole to be drilled. With the power head motor energized, the power head is then lowered into the sleeve (and pushed, if necessary), such that the bit B penetrates the workpiece W and drills a hole H. The downward movement of the power head ceases, however, when the roof 55a of the channel 55 engages the pre-set stop member 51. At this stage, the blind hole H has been drilled to the previously selected depth, and with no guessing or estimation on the part of the human operator.

In accordance with another aspect of the present invention, means are provided to lock the power head against motion relative to the sleeve 21 when the two have any desired relative position, and whether or not the roof 55a of the channel 55 is engaged with the stop member 51. The stop/lock assembly 50 as shown and described with reference to FIG. 6 constitutes such means and serves this second function. With the power head 20 adjusted to a desired vertical position within and relative to the sleeve 21, the human operator may simply tighten the clamping ring 54 to fix the stop assembly in the sleeve 21 and screw the bolt 52 inwardly through the stop member 51 so that the bolt applies pressure to the plate 53 and biases the friction material 53′ into tight, locking engagement with the opposed surface of the channel 55. Thus, the assembly 50 is rigidly gripped or fixed to the sleeve 20 by the stop member 51 and the clamping ring 54, while the friction material 53′, plate 53, and bolt 52 have locked engagement with the power head 20—so that the sleeve and power head cannot move relative to one another in a direction parallel to the axis of the chuck 25. By this adjustment, the elevation of a cutter or any operative element relative to the plane of the undersurface 38 on the foot 36 may be established and retained as long as desired.

Referring momentarily to FIG. 11, the use of the present power tool to cut a groove G of desired depth in a workpiece $W_1$ is illustrated. It will be apparent that as the foot 36 of the power tool is translated in supported, sliding engagement with the flat surface of the workpiece $W_1$, the depth of the groove G will be determined by the amount to which a routing cutter RC projects beneath the plane of the undersurface on the foot 36. Unless the power head were locked in the sleeve, the power head might vibrate vertically in the sleeve and make the depth of that groove G nonuniform. By locking the sleeve and the power head together in a selected, adjusted position, however, then an operator holding the sleeve itself in his hands can be assured that such vertical vibration does not occur. Constant but pre-adjustable depth of a cutter in a workpiece is thus easily achieved.

Figure 3:
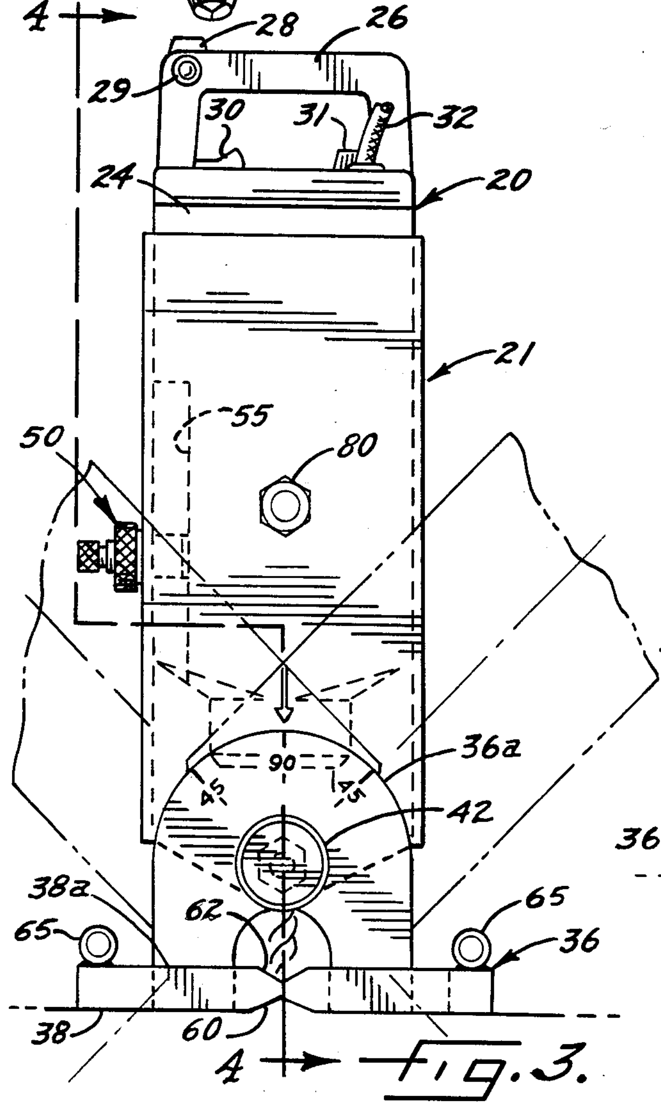
FIG. 3 is a side elevation of the power tool and illustrating in phantom lines a range of angular adjustment.

In accordance with another feature of the invention, means are provided to adjustably establish any desired angle between the axis of the motor shaft and chuck 25, on the one hand, and the plane of the foot 36, on the other hand. As will become apparent, this permits a hole to be drilled in a flat workpiece at any desired angle (including a conventional hole drilled at 90° into a workpiece) without reliance upon the visual accuity and the muscular skill of a human operator. In the present instance, such means for establishing a desired and adjusted angle are constituted by the threaded studs 41 and their knobs 42 engaged with the nuts 44 (as previously described with reference to FIG. 4) which form an adjustable pivot connection between the foot 36 and the body 40 of the sleeve 21. When the knobs 42 are loosened, then the sleeve 21 may be swung about the axis of the studs 41 to various angular positions relative to the flat foot 36, as illustrated by the phantom lines in FIG. 3. If desired, an angular scale may be printed or etched on the outer surfaces of the ears 36a so that the particular angle of adjustment may be read from an index mark fixed to the side of the sleeve 21. To repeat, it is only necessary that the knobs 42 be loosened, that the sleeve be adjusted in a pivoting sense as illustrated in FIG. 3, and that the knobs be retightened once a desired angle has been established.

Figure 7:
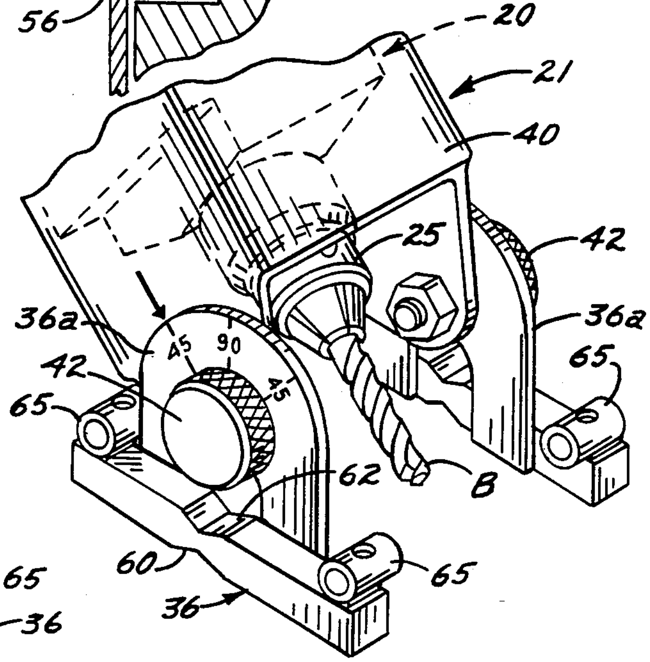
FIG. 7 is a fragmentary perspective view illustrating the manner in which the power tool may be employed to drill a hole at a selected angle to a flat surface of a workpiece.

With reference to FIG. 7 where such an adjustment has been made to an angle of 45°, it will be apparent that with a drill bit B held in the chuck 25, as the power head is manually fed downwardly or inwardly through the sleeve 21, the drill bit will enter the surface of the workpiece, upon which the foot 36 is resting, at the selected angle. The steadiness of the human operator's hands is not required to maintain that angle at which the hole is drilled; rather, the operator need only hold the sleeve and its foot firmly in place on the workpiece and then push the power head downwardly through the sleeve to drill the hole at the desired angle.

It has always been difficult for the user of a conventional hand drill to successfully drill holes through rod-like workpieces. Even if a center punch is employed to locate the start of a hole, it is difficult for the operator to prevent rotation of the workpiece and to maintain the drill bit aimed in the proper direction. In accordance with another aspect of the invention, provision is made to stably support rod-like workpieces in relation to the sleeve 21 and such that a cutting bit in the power head chuck will easily and successfully drill a hole through that workpiece. In carrying out this aspect of the invention, a pair of V-shaped or tapered grooves are formed in the foot 36 at opposite peripheral regions lying along a straight line which perpendicularly intersects the axis of the chuck 25 when the sleeve is in its 90° angular position. A rod-like workpiece (e.g., a dowel or pipe) may be disposed in these tapered grooves for stable support while a drilling cutter acts thereon.

Figure 9:
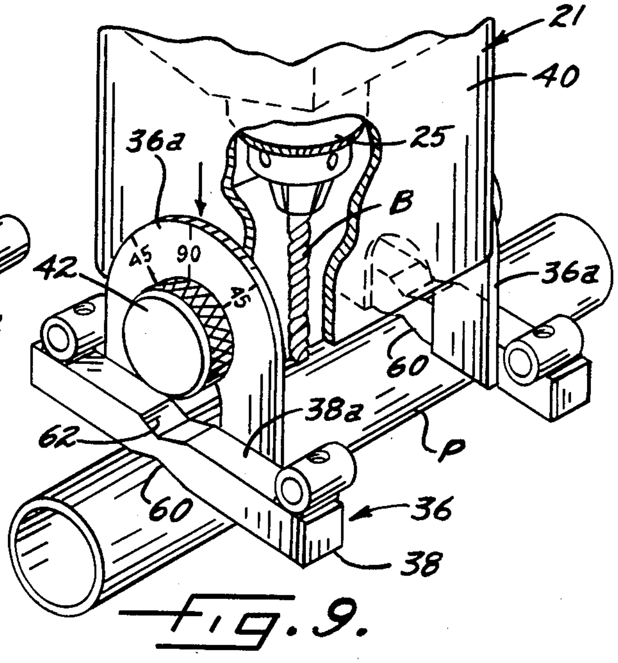
FIG. 9 is a fragmentary perspective view illustrating the manner in which the power tool may be employed to act on a rod-like workpiece of relatively large diameter.

More particularly with reference to FIG. 9, the undersurface 38 of the foot 36 is relieved to form two relatively broad V-shaped or tapered grooves which lie along a straight line lying beneath the chuck axis. With these tapered grooves present, it is a simple matter to support and rest the foot 36 of the sleeve 21 on the curved surface of a relatively large diameter rod-like workpiece here shown as a pipe P. Frictional engagement of the pipe in these grooves due to the weight of the composite power tool and supplemental downward pressure applied by a human operator will prevent rotation of the pipe about its axis as the power head is moved downwardly through the sleeve 21 to make a drill bit B enter into and drill a hole through the pipe P. Thus, by the simple provision of a pair of tapered grooves in the undersurface of the foot 36 on the sleeve 21, holes in workpieces such as the pipe P can be quickly and accurately drilled.

Figure 8:
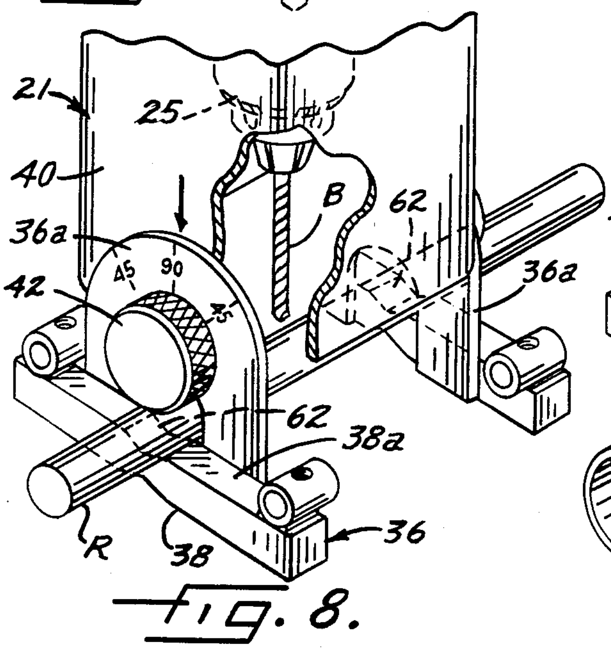
FIG. 8 is a fragmentary perspective view illustrating the manner in which the power tool may be employed to act on a rod-like workpiece of relatively small diameter.

Rod-like workpieces of relatively small diameter (compared to those such as the pipe P of larger diameter) may be more conveniently acted upon by placing them on the upper or top surface 38*a* of the foot 36. As shown in FIG. 8, a small diameter rod R is inserted through cut-out passages in the ears 36*a* to rest in a pair of V-shaped grooves 62 formed at peripherally opposite locations which lie along a straight line and beneath the axis of the chuck 25. With the rod R stabilized by engagement with the walls of the grooves 62, the power head may be manually fed downwardly through the sleeve 21 to cause a rotating drill bit B to drill a hole through that rod. No "aiming" of the power head by muscular dexterity of the operator is required, nor does he need to be at all concerned (as in the drilling illustrated by FIG. 9) with manually controlling the attitude of the sleeve 21 in an angular direction about the axis of the rod R.

As mentioned briefly above, the head 20 may be locked against relative telescoping movement in the sleeve 21 when the bolt 52 is threaded inwardly to make the plate 53 and friction material 53' (FIG. 6) firmly engage the innermost flat surface of the channel 55 in the casing 24, and with the clamping ring 54 tightened. This permits any cutter or operative element in the chuck to be adjustably positioned relative to the plane defined by the undersurface 38. For sanding (or similar operations such as planing or polishing) a flat workpiece $W_2$ (FIG. 10), this feature permits a sanding disc SD to have its face set very slightly below, but parallel to, the foot surface. The entire power tool is then placed on the workpiece $W_2$ with the foot 36 automatically holding the sanding face essentially parallel to the work surface. The operator then need only slidably translate the power tool with the foot sliding on the workpiece surface to effect sanding of the work. In the use of a sanding disc in an ordinary electric hand drill, it is difficult manually to keep the sanding disk in full, flat engagement with a workpiece surface; with the present power tool, the foot 36 of the sleeve 21 automatically keeps the shaft of the power head perpendicular to the work surface and thus the sanding disc in essentially flat contact with the work. If desired, the locking means constituted by the assembly 50 may be released so that the sanding disc is biased downwardly by the weight of the power head itself.

For routing or milling operations (FIG. 11), the locking means 50 are first adjusted to set the rotating cutter so that it projects a desired distance (the desired depth of a groove G to be cut) beyond the undersurface of the foot 36. Then, by complete manual control (as in FIG. 10), the power tool may be moved with the foot 36 in sliding contact on the surface of a workpiece $W_2$ to form the groove G with a desired configuration, whether it be straight line segments or arcuate as viewed from above. This will require some skill on the operator's part to control motions in compound horizontal directions, but he is not burdened with the tasks of manually keeping the cutter perpendicular (or at any other desired angle) to the work surface and at a constant depth. It would be virtually impossible or impractical to cut an accurate groove with a routing cutter held in an ordinary hand drill.

When a guide surface is available, the path of the routing cutter RC in a horizontal direction may be precisely controlled with the aid of a fence. In accordance with another feature of the present invention, means are provided near the lower end of the sleeve 21 (e.g., on the foot 36) to adjustably receive and lock one or more connecting rods attached to a guide member or fence shaped to engage a guide surface. The rods extend in a direction perpendicular to the axis of the chuck 25.

As shown as a preferred example in FIG. 11, the adjustment and locking means take the form of short tubes 65 welded on the top of the foot 36 at its four corners and oriented with their axes parallel to one another but perpendicular to the axis of the chuck 25. The two tubes in each of two pairs are axially aligned with one another. Each pair of aligned tubes receives a connecting rod 66 adjustable in lengthwise position but releasably retained by means such as hexsocket screws 68. The rods 66 carry a guide member 69 in the form of an angle strip, the inner surface of the vertically depending portion 69*a* forming a fence. It is a simple matter to accurately route out a groove G parallel to and spaced a desired distance from a straight edge E on the workpiece $W_1$. The guide member 69 is adjusted to the desired spacing from the routing cutter and the screws 68 are then tightened to lock the rods 66 in the tubes 65. Now, with the foot 36 resting on the workpiece and the tool positioned such that the guide member will slide along the edge E, the entire portable tool may be manually fed along a straight line, the guiding action of the member 69 engaged with the edge E making certain that the foot 36 slides in a straight path. The groove G is thus cut accurately parallel to the straight edge E and with a desired spacing therefrom.

Another advantage and use—not self-apparent—accrues from the power tool as thus far described. The body of the sleeve 21, as here shown and described, is shaped to define two flat, parallel surfaces on opposite sides of its exterior. This makes it feasible, quick, and convenient to reliably and firmly mount the power tool as a whole on any readily available structural support member so that the driven shaft with its chuck 25 becomes a permanently located power spindle. As illustrated by way of example in FIG. 12, the sleeve 21 with the power head 20 locked therein, is firmly mounted by a conventional C-clamp 70 on an ordinary work bench or table 71. One flat side of the power tool rests with stability on the table surface, and the C-clamp reliably engages the underside of the table and the upper flat slide of the power tool. Thus, a grinding wheel 72 (or any other desired operative element) may be placed in the chuck, and metal objects such as knives or mower blades may be conveniently ground. Preferably, but not necessarily, the foot 36 is removed from the sleeve body when the power tool is used in this fashion. It is a simple matter simply to unscrew the knobs 42 and take the foot 36 away from the sleeve body.

It is much less convenient and reliable to firmly attach a conventional electric hand drill to a table or bench so that the shaft and chuck may be used as a power spindle fixed in its location. This is so because the casing of a conventional hand drill is usually of generally cylindrical shape and a pair of clamping bands, wrapping around the body and attached to the table, are required to hold the drill firmly on a support structure such as the table.

While in FIG. 12 the locking means 50 are assumed to be holding the power head 10 fixed so that it cannot move relative to the sleeve 21, it would be possible to release the lock 50, place a drill bit in the chuck, and then drill horizontally oriented holes in a workpiece by manually pushing the power head into the sleeve. Indeed, if the clamp 70 is used to mount the sleeve 21 on a vertically disposed flat surface structural support (rather than the horizontal table 71), the tool may be used in the general fashion of a drill press by manual feeding of the power head down through the sleeve relative to a workpiece resting on an underlying table.

It is not necessary, however, that the power head casing and its cooperative sleeve be configured with a square or rectangular cross-section, and with opposite flat exterior surfaces, in order to achieve the principal advantages of the invention in its broader aspects. So long as the power head has a crosssectional shape of any specific configuration, and the sleeve is constructed with inner surfaces which mate with the power head to afford relative sliding parallel to the axis of the driven shaft, but to prevent relative rotation, some but not all of the diverse uses and advantages may be obtained. FIG. 13 makes this clear by a second example, where the power head 20A is formed with a casing 24A of circular cross-section but with external, longitudinal ribs 75. A sleeve 21A of generally circular cross-section receives the power head 20A therein, the inner surfaces of the sleeve defining slots 76 which slidably receive the ribs but which prevent rotation of the power head relative to the sleeve.

Figure 4:
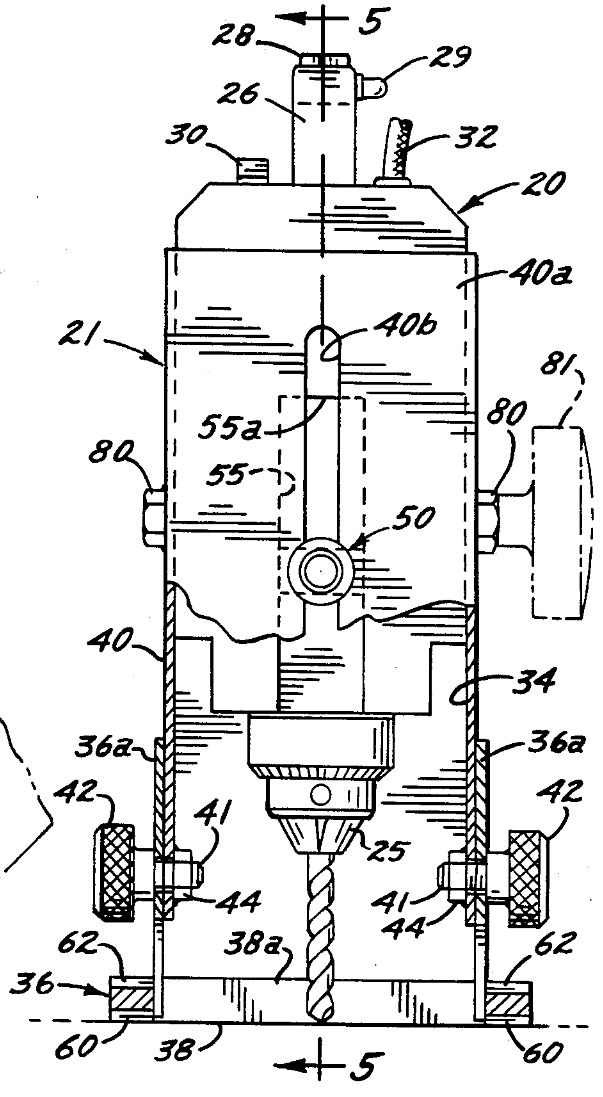
FIG. 4 is a vertical elevation, partially in section, taken substantially along the offset line 4—4 in FIG. 3.

As an optional detail illustrated in FIG. 4, provision may be made for aiding a human operator in manually translating the power tool with its foot moving in sliding engagement with a workpiece (as described with reference to FIGS. 10 and 11, for example). As shown in FIG. 4, two nuts 80 may be welded in vertically medial regions of two side surfaces of the sleeve body to form blind threaded holes. Then, a removable and preferably rather large hand knob 81 may be optionally used by a human operator by threading it in to one or the other of those nuts. Thus, the human operator may grasp the power head handle 26 in one hand (which also controls the on-off trigger 28) while grasping the knob 81 in the other hand to aid in either holding, translating, or lifting the entire power tool.

Still other applications, not obtainable from an ordinary hand drill, are possible with the present power tool. For example, a circular saw blade having a perpendicular shank may be mounted in the chuck 25. With the sleeve 21 removed therefrom, one flat side of the power head 20 may be rested on a flat workpiece (e.g. a sheet of plywood) to keep the saw plane perpendicular ("square") to the workpiece as the power head is manually moved with sliding action to perform a sawing cut. If desired, the power head 20 may be locked in the sleeve 21 during this type of operation, with the foot 36 removed from the sleeve; that flat side of the sleeve which has neither of the nuts 80 nor the assembly 50 thereon will rest upon and be slidably translated over the workpiece surface.

If a circular saw blade larger in diameter than the foot 36 is employed, and an upstanding guide strip is tacked to the work surface, then the sleeve 21 may be held in a horizontal orientation with a portion of the foot 36 abutted against a vertical surface of the guide strip as it is slidably moved along the strip. In this fashion, a reliably straight sawing cut may be accomplished.

The sleeve 21 which forms an important element of the invention is relatively simple and inexpensive, at least in comparison to the other element, that is, the power head 20. This means that the user of the power tool might logically and inexpensively obtain several of the sleeves for use alternatively with a single power head. For example, if a given job is going to require drilling a large quantity of 90° blind holes to one depth, a large quantity of 45° blind holes to another depth, and a large quantity of holes at a certain 60° angle—but the holes of each nature must be made in some interleaved sequence—, then three sleeves could be preset for the three types of holes, and a single power head quickly associated with the corresponding sleeve as each type of hole is drilled. Still further, a plurality of sleeves might be permanently mounted to make up different types of "work stations", and a single power head could be moved into any given station as and when required. For example, one sleeve could be mounted by bolts vertically beneath the aperture of a table to receive a power head and create a shaper; another sleeve could be mounted by bolts or clamps to receive the power head with a pulley in its chuck so as to quickly receive a belt for drive of a certain device such as a pillow block belt sander; and another sleeve could be mounted by bolts in horizontal orientation beneath a slotted table to receive a power head into which a circular saw blade is chucked, thereby to create a table saw. In all such cases, relocation of a single power head would be quick and easy, and the driven cutter or operational element would reliably and reproduceably be located each time.

From the foregoing, it may now be seen that the present invention brings to the art a highly versatile, portable power tool which yields uses and advantages not obtainable with an ordinary electric hand drill. Yet, all that is required is a relatively simple, inexpensive and portable sleeve with interior surfaces matched to the chosen and predetermined cross-sectional shape of the power head. The power head itself does not differ appreciably in organization or cost from a conventional electric hand drill, and indeed that power head may be used apart from its cooperating sleeve in the same fashion as a hand drill.

The combination and cooperation of the power head and the sleeve give the user significant and diverse capabilities not available from an ordinary electric hand drill. First, he can pre-establish and maintain, without worry about deficiencies in his dexterity and skill for manual control, a uniform depth of cut produced by a selected cutter (as explained with reference to FIGS. 10 and 11). Secondly, he can preestablish the depth of a blind hole or the like to be drilled by progressive penetration of a cutter or drill bit into a workpiece (as explained with reference to FIG. 5). Thirdly, and importantly, he can preestablish and maintain (again, without worry about manual control skills) the attitude or angle with which the driven cutter or the like engages a workpiece, so that holes may be drilled accurately at any desired angle (FIG. 7)—and, significantly in many cases, so that the chuck and cutter may be maintained always at 90° to the work surface (as in FIGS. 5, 10 and 11). Fourthly, rod-like workpieces may be engaged with enhanced stability while being acted upon by a cutter in the power head (FIGS. 8 and 9). Finally, the new portable power tool adapts conveniently and reliably to form a generally stationary power spindle held in a desired position on any convenient support structure such as a table (FIG. 12).

I claim:

1. The combination of (a) a portable motorized power head having a driven shaft adapted to receive and hold a cutter or the like,
said power head having a predetermined cross-sectional shape in a direction transverse to the axis of said shaft, (b) a portable sleeve having interior surfaces mating to the cross-sectional shape of said power head to receive the latter in longitudinal sliding relationship in a direction parallel to the axis of said shaft while preventing relative rotation of the head and sleeve about such axis,
said sleeve being shaped to define two parallel flat surfaces on opposite sides of its exterior, whereby the sleeve may be disposed with one of the flat surfaces resting on a flat support structure and may be clamped to the structure by clamp means engaged with the other flat surface, and said sleeve being adapted at one end to rest for support on a work surface.

2. The combination set forth in claim 1 further including adjustable stop means defining a limit position to which said power head may move toward said one end of said sleeve.

3. The combination set forth in claim 1 or 2 further including means for releasably locking said power head in said sleeve at various desired positions along a direction parallel to the axis of said shaft.

4. The combination set forth in claim 1 or 2 further including a flat foot constituting said one end of said sleeve, and pivotally adjustable means for changeably establishing the angle between the axis of the sleeve and the plane of the foot.

5. The combination set forth in claim 1 or 2 further characterized in that said one end of said sleeve is constituted by a flat foot having a central opening substantially coextensive with the passage through the sleeve, said foot having a pair of tapered grooves formed in its undersurface at peripherally opposite locations lying along a straight line transverse to the sleeve axis, whereby the foot may be stably held on rod-like workpieces to be acted upon by a cutter mounted on said shaft.

6. The combination set forth in claim 1 or 2 wherein said sleeve comprises a main body with a flat foot spaced from the body to form said one end, said foot having a pair of tapered grooves formed on its upper surface (which is opposite to its undersurface) at peripherally opposite locations lying along a straight line transverse to the sleeve axis, whereby rod-like workpieces may be stably received in said tapered grooves to be acted upon by a cutter or the like mounted on said shaft.

7. The combination set forth in claim 1 or 2 further including means for relesably locking said power head at various desired positions along a direction parallel to the axis of said shaft, a fence comprising a guide member and at least one connecting rod extending perpendicularly thereto, and means for attaching said at least one connecting rod to said one end of said sleeve with adjustability of the distance between the guide member and said one end.

8. The combination set forth in claim 1 further including means for releasably locking said power head in said sleeve at various desired positions along a direction parallel to the axis of said shaft, and said sleeve comprises a hollow body with a flat foot at said one end together with pivotally adjustable means connecting the foot to the body for changeably establishing the angle between the axis of the body and the plane of the foot.

9. The combination set forth in claim 1 wherein said sleeve comprises a hollow body, a flat hollow foot at said one end, and adjustable pivot means connecting the foot to the body for changeably establishing the angle between the axis of the body and the plane of the foot's undersurface; the foot's undersurface having a pair of tapered grooves formed therein at peripherally opposite locations lying along a straight line, whereby the foot may be stably held on rod-like workpieces to be acted upon by a cutter mounted on said shaft.

10. The combination set forth in claim 1 wherein said sleeve comprises a main body with a foot connected to but spaced from the body, the foot being formed as a member open at its medial region, and adjustable pivot means connecting said foot to said body for changeably establishing the angle between the axis of the body and the plane of the foot's undersurface; the upper surface of said foot having a pair of tapered grooves formed therein at peripherally opposite locations lying along a straight line, whereby a rod-like workpiece may be stably received in said grooves to be acted upon by a cutter mounted on said shaft.

11. The combination of (a) a portable motorized power head having a driven shaft adapted to receive and hold a cutter or the like,
said power head having a predetermined cross-sectional shape in a direction transverse to the axis of said shaft, (b) a portable sleeve having interior surfaces mating to the cross-sectional shape of said power head to receive the latter in longitudinal sliding relationship in a direction parallel to the axis of said shaft while preventing relative rotation of the head and sleeve about such axis,
said sleeve comprising a main body with a foot connected to but spaced from the body, the foot being formed as a member open in its medial region and adapted to rest for support on a work surface, and adjustable pivot means connecting said foot to said body for changeably establishing the angle between the axis of the body and the plane of the foot's undersurface; both the undersurface and the opposite upper surface of said foot having a pair of tapered grooves formed therein at peripherally opposite locations lying along a straight line, whereby a rod-like workpiece received in either pair of grooves is stabilized by the groove walls.

* * * * *